Sept. 15, 1964 I. M. LAURIEN Re. 25,641

RESILIENT CONTACT REED RELAY

Original Filed May 11, 1959

INVENTOR.
Ira M. Laurien
BY
Olson & Treyler
Attys.

United States Patent Office

Re. 25,641
Reissued Sept. 15, 1964

25,641
RESILIENT CONTACT REED RELAY

Ira M. Laurien, Williamsville, N.Y., assignor to The Wurlitzer Company, Chicago, Ill., a corporation of Ohio Original No. 2,990,461, dated June 27, 1961, Ser. No. 812,281, May 11, 1959. Application for reissue Mar. 28, 1963, Ser. No. 268,846
11 Claims. (Cl. 200—91)

Matter enclosed in heavy brackets [ ] appears in the original patent but forms no part of this reissue specification; matter printed in italics indicates the additions made by reissue.

This invention relates generally to the art of electric relays, and particularly to a resonant reed relay.

Resonant reed relays are used quite commonly in frequency selective circuits. Remote control garage door operators frequently employ resonant reed relays in order that similar operators in a given location may respond only to a preselected signal. Such relays incorporate a tuned vibratory reed having a natural frequency of vibration. When such a reed is exposed to an alternating current field substantially coinciding with the tuned natural frequency of vibration, the reed will be set in vibration. The vibrating reed then may be used to close a set of contacts intermittently, whereby to effect charging or discharging of a capacitor, and hence to control the conduction of an electronic tube, for example.

Generally speaking, reeds as heretofore used in vibrating reed relays have been used singly. That is to say, there has been a single vibrating reed cooperating with a more-or-less fixed contact. As is pointed out in a copending application of Fred H. Osborne, Serial No. 779,992, filed December 12, 1958, *now U.S. Patent 3,064,097 issued November 13, 1962*, a pair of similarly tuned vibrating reeds carrying cooperating contacts provide a superior structure. The reeds do not react on the base or mount to any substantial extent, but rather on one another, thereby rendering the mass of the base or mount of little importance. Furthermore, physical shock is not likely to set a pair of such reeds in sustained vibration so as to cause operation of the relay.

One phenomenon which occasionally causes trouble has been found in the pair of cooperating vibratory reeds. Specifically, when such reeds have been designed for a response region of one and one-half percent (plus or minus three-quarters percent) about the resonant frequency, it has been found that response starts within the desired region. It further has been found that upon decreasing of the applied frequency, the reeds drop out of vibration at the desired position. However, upon increasing the frequency, once the reeds have started to vibrate, the reeds continue to vibrate for an additional region of perhaps five percent. This is clearly undesirable. The reason for this is not immediately apparent.

However, I have discovered that this is due to an increase in the "apparent stiffness" of the reeds as they vibrate and impinge upon one another. This "apparent stiffness" raises the top limit of the response region.

Accordingly, it is an object of the present invention to provide a pair of cooperating tuned reeds which respond uniformly above and below a nominal response frequency, within a narrow limit.

More specifically, it is an object of this invention to provide a pair of such cooperating tuned reeds in which the "apparent stiffness" does not increase once the reeds have started to vibrate.

In particular, it is an object of this invention to provide a resonant reed relay having a pair of cooperating tuned reeds wherein each reed carries a contact cooperable with the contact on the other reed, and wherein at least one of these contacts is resilient.

Other and further objects and advantages of the present invention will be apparent from the following description when taken in connection with the accompanying drawings wherein.

Figure 1:
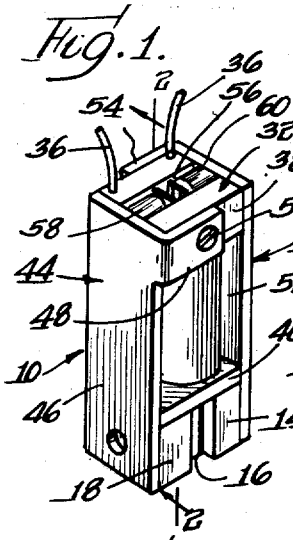
FIG. 1 is a perspective view of a resonant reed relay constructed in accordance with the principles of this invention.
Figure 2:
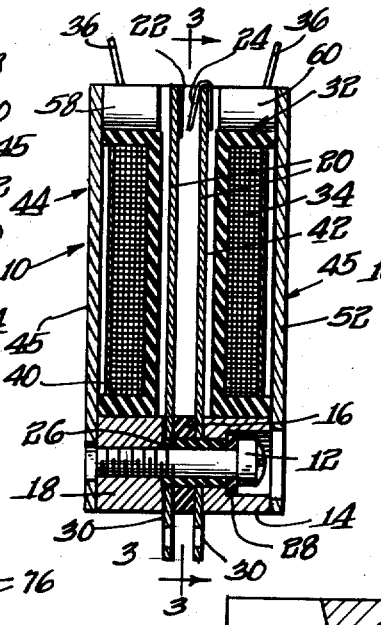
FIG. 2 is a longitudinal sectional view through the relay as taken along the line 2—2 in FIGS. 1 and 3.
Figure 3:
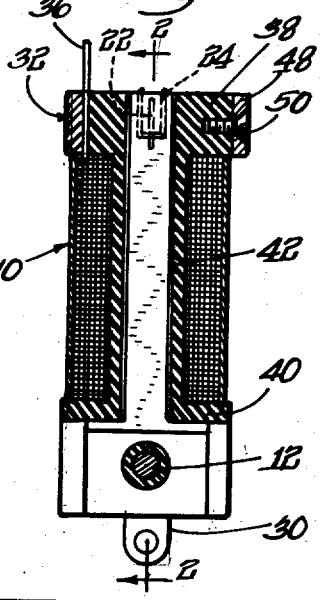
FIG. 3 is a longitudinal sectional view as taken along the line 3—3 in FIG. 2.

Referring now in greater particularity to the drawings, and first to FIGS. 1–3, there will be seen a resonant reed relay designated generally by the numeral 10. At the bottom of the resonant reed relay, there is a screw 12 extending through a steel base member or slug 14, an insulating spacer 16, and threaded into a steel slug or base member 18. A pair of reeds 20 of spring steel or other suitable magnetizable resilient material are mounted on opposite sides of the insulating spacer 16, respectively in engagement with the steel slugs 14 and 18. The reeds are provided at their upper ends with contacts 22 and 24, respectively, about which more will be said shortly hereinafter.

The reeds are insulated from the screw by a cylindrical spacer 26. The screw is further insulated from the steel block or slug 14 by an insulating washer 28. Apertured ears or tabs 30 conveniently may be provided on the lowermost ends of the reeds for effecting electrical connection thereto.

The relay 10 further includes an insulating spool 32 on which an operating coil 34 is wound, the latter having lead wires 36 extending therefrom, and preferably molded in or projecting through a head 38 forming an integral part of the spool 32. The spool also includes a radially extending base 40, as will be apparent. The spool is provided with an axial bore 42, through which the reeds 20 extend, the base 40 of the spool being mounted on top of the steel slugs 14 and 18, and held thereto in a suitable manner, such as by bonding.

The magnet further is provided with steel brackets 44 and 45. The bracket 44 comprises a vertical strap 46 having a lower end thereof in magnetic engagement with the steel block 18, and having at the upper end a right angularly disposed arm 48 lying along side the head 38, and secured thereto as by a screw 50. Similarly, the bracket 45 comprises a vertical strap 52 mounted in magnetic engagement with the steel block or slug 14. The bracket 45 has at the upper end thereof a right angularly disposed arm 54 secured to the head 38 by suitable means, such as a screw (not shown).

The head 38 of the spool 32 is provided with a U-shaped transverse groove 56 mounting a pair of small, cylindrical permanent magnets 58 and 60, respectively in engagement with the brackets 44 and 45, and positioned adjacent the tops of the reeds 20. The magnets are mounted with like poles confronting one another, for example, the north poles.

When the coil or winding 34 is energized by electrical connections to the lead wires 36, the reeds 20 serve as a core of electromagnet comprising the reeds and the coil. The magnetic path from one end of the reeds to the other is very nearly complete through magnetically conductive steel or the like, comprising the brackets 44 and 45, the steel blocks or slugs 14 and 18, and the magnets 58 and 60. In the illustrative embodiment, the only air gap is between the north poles of the magnets and the adjacent free ends of the reeds. It will be understood that alternating current is applied to the coil, and hence, at one instant the top ends of the reeds (in the position shown in the drawings) will comprise north poles. Although these will tend to repel each other, they will be more strongly repelled by the north poles of the electromagnets, and hence the contacts 22 and 24 will tend to be forced into engagement. At a subsequent interval, the upper ends of the reeds will comprise south poles. These again will tend to repel each other, and further will be attracted to the adjacent north poles of the permanent magnets. Accordingly, the reeds will be deflected away from one another, and the contacts 22 and 24 will be held out of engagement. Subsequently, the polarity of the reeds will be reversed, and the contacts will be forced toward engagement. Such forcing toward engagement will be augmented by the natural swing of the reeds as they return through the rest position after having been attracted toward the permanent magnets. The initial short interval of polarization in any given direction will be insufficient to cause the reeds to deflect sufficiently to cause contact engagement. A few cycles will be necessary to build up sufficient amplitude of reed vibrations to cause the contacts to engage. If the energizing frequency is not substantially the same as the natural frequency of the reeds, then it will not be possible to build up a sufficient amplitude of vibration for the contacts to close.

In the present invention, the vibrational frequency of the reeds is not dependent solely upon the natural frequency of the reeds. The magnets 58 and 60 impose a rather strong force on the reeds, and hence the reeds may be made to vibrate at frequencies slightly different from their inherent natural frequencies. Such forced or semi-natural vibration may be controlled somewhat in frequency by shifting of the magnets longitudinally of their own axis (transversely of the reeds). As will be understood, once the magnets have been placed in proper position, it is a simple matter to add a small amount of cement or other adhesive to hold the magnets permanently in such position.

Figure 5:
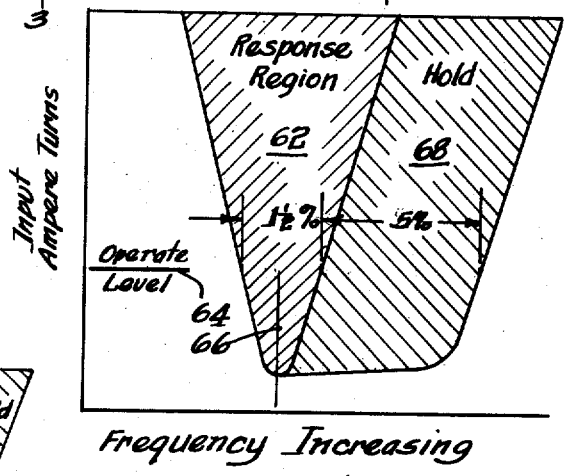
FIG. 5 is a diagram or graph illustrating the undesirable hold characteristics of the reeds prior to the improvement herein.

Referring now to FIG. 5, there is shown a graph of input ampere turns against the frequency. The response region of the reeds is indicated by the shaded area at 62. The relay is intended to operate at a given level of ampere turns as indicated at 64. At this level, the response region is one and one-half percent of the nominal frequency, as indicated at 66. Of course, at lower input levels the response region becomes more narrow and at higher input levels the response region broadens somewhat. The characteristics such as heretofore described are not desirable. However, it has been found that when the reeds 20 are provided with rigid contacts, the engagement of the contacts against one another increases the "apparent stiffness" of the reeds, and causes them to continue to respond to a "hold" region 68 extending for five percent above the response region. If the frequency initially applied to the reeds falls within the "hold" region, there will be no response. However, once the reeds have started in vibration by application of a frequency within the response region, they will "hold," or continue in vibration if the frequency moves up into the "hold" region. Obviously, this is undesirable.

Figure 4:
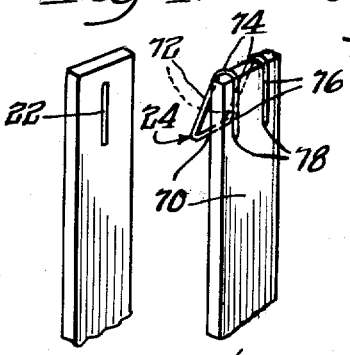
FIG. 4 is a perspective view of the upper ends of the cooperating reeds.

It has been found that this "hold" region can be reduced to an inconsequential amount by providing a resilient contact on one of the reeds. Thus, referring specifically to FIG. 4, the contact 22 on one of the reeds 20 comprises a straight length of wire which is soldered, brazed or welded on the center line of the reed near the tip thereof. This wire may be of any suitable contact material, and is rigid with the reed on which it is mounted. The contact 24 is another matter. This contact is more or less U-shaped in form, having a horizontal bight 70 spaced outwardly from the reed 20 from which it is associated, toward the other reed 20. The contact 24 has a pair of upstanding legs 72 at opposite ends of the bight 70, and these legs are looped over the top of the reed 20 as at 74, depending along the back side of the reed at 76. The lower ends of the depending sections 76 are welded, brazed or soldered to the back side of the reed 20 at 78.

Figure 6:
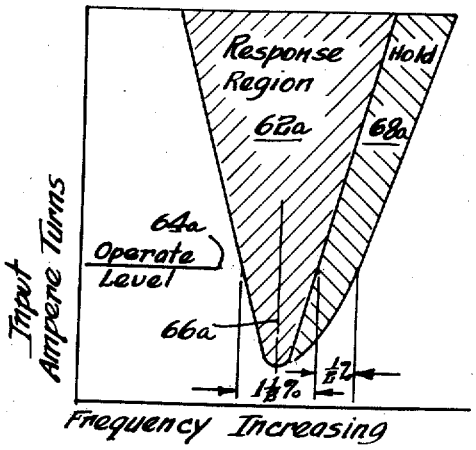
FIG. 6 is a similar graph showing the hold characteristics of the present invention.

As will be apparent, the contact 24 is a flexible contact. The legs 72 may flex, and the bight may bend somewhat in the center thereof. The looped portions 74 may bend, and the depending portions 76 may deflect outwardly away from the back of the reed, it being understood that the contact 24 is made of resilient wire. As a result, a response graph is produced as shown in FIG. 6, similar parts being indicated thereon by numerals similar to those heretofore used, with the addition of the suffix "a." Thus, the response region 62a is again one and one-half percent of the nominal response frequency 66a at the operating level 64a. However, in this instance, the "hold" region 68a has been reduced to one-half percent. This is a reduction on the scale of 10:1, and makes the "hold" region insignificant.

As set forth in the aforesaid Osborne co-pending patent application, the pair of tuned reeds provides advantages over a single tuned reed, including lack of reaction of the reeds on the base, lack of spurious response due to physical shocks, and improved frequency stability. In addition, the present reed relay as disclosed in this application has a minimized vibrational "hold" region in addition to the designed response region.

The specific example of the invention as herein shown and described is for illustrative purposes only. Various changes in structure will no doubt occur to those skilled in the art, and will be understood as forming a part of this invention isofar as they fall within the spirit and scope of the appended claims.

The invention is claimed as follows:

1. A resonant reed relay comprising a pair of reeds each having a base and a tongue, common means mounting said bases electrically insulated from one another with said tongue extending in parallelism therefrom and having opposed free ends, said reeds being of magnetically susceptible material and being of substantially the same size and having substantially equal natural frequencies of vibration, the free ends of said reeds having contact means thereon *extending substantially no farther than the ends of said reeds and* normally spaced apart and capable of engagement upon vibration of said reeds, coil means and means mounting said coil means about said reeds for magnetizing said reeds upon electrical energization of said coil means, energization of said coil means with alternating electric current of substantially the same frequency as the natural frequency of vibration of said reeds causing said reeds to tend to vibrate for causing said contact means to come into engagement, at least one of said contact means being resilient, *and extending substantially throughout its length diagonally out away from the end of the reed on which it is mounted and back toward the base of that reed and having a free extremity disposed opposite the contact means on the other reed for contact therewith,* the portion of the resilient contact means engageable with the other contact means being resiliently movable relative to the reed on which it is mounted, whereby to diminish contact bounce and apparent stiffening of the reeds upon engagement of said contact means.

2. A resonant reed relay comprising a pair of reeds each having a base and a tongue, common means mounting said bases electrically insulated from one another with said tongue extending in parallelism therefrom and having opposed free ends, said reeds being of magnetically susceptible material and being of substantially the same size and having substantially equal natural frequencies of vibration, the free ends of said reeds having contact means thereon normally spaced apart and capable of engagement upon vibration of said reeds, coil means and means mounting said coil means about said reeds for magnetizing said reeds upon electrical energization of said coil means, energization of said coil means with alternating electric current of substantially the same frequency as the natural frequency of vibration of said reeds causing said reeds to tend to vibrate for causing said contact means to come into engagement, one of said contact means comprising a resilient wire extending obliquely *substantially throughout its length* out from the reed on which it is mounted *back toward the base of such reed and* toward the opposed reed and cooperable with the contact on the opposed reed *and having a free extremity disposed opposite the contact means on the other reed for contact therewith.*

3. A resonant reed relay comprising a pair of reeds each having a base and a tongue, common means mounting said bases electrically insulated from one another with said tongue extending in parallelism therefrom and having opposed free ends, said reeds being of magnetically susceptible material and being of substantially the same size and having substantially equal natural frequencies of vibration, the free ends of said reeds having contact means thereon normally spaced apart and capable of engagement upon vibration of said reeds, coil means and means mounting said coil means about said reeds for magnetizing said reeds upon electrical energization of said coil means, energization of said coil means with alternating electric current of substantially the same frequency as the natural frequency of vibration of said reeds causing said reeds to tend to vibrate for causing said contact means to come into engagement, one of said contact means comprising a resilient U-shaped member having a pair of legs and a bight, the ends of said legs opposite the bight being mounted adjacent said reed on which that contact means is mounted, and the bight being spaced from that reed toward the other reed and arranged for engagement by the contact means on the other reed.

4. A resonant reed relay as set forth in claim 3 wherein the ends of the U-shaped contact legs are disposed adjacent the end of the reed on which that contact is mounted, and the bight is spaced back from the end of that reed.

5. A resonant reed relay comprising a pair of reeds each having a base and a tongue, common means mounting said bases electrically insulated from one another with said tongue extending in parallelism therefrom and having opposed free ends, said reeds being of magnetically susceptible material and being of substantially the same size and having substantially equal natural frequencies of vibration, the free ends of said reeds having contact means thereon normally spaced apart and capable of engagement upon vibration of said reeds, coil means and means mounting said coil means about said reeds for magnetizing said reeds upon electrical energization of said coil means, energization of said coil means with alternating electric current of substantially the same frequency as the natural frequency of vibration of said reeds causing said reeds to tend to vibrate for causing said contact means to come into engagement, said reeds having confronting front faces and oppositely disposed back faces, the contact means on at least one of said reeds comprising a looped member having extremities spaced back from the end of the reed on the oppostie face thereof, the extremity of the contact member on the back of the reed being secured to said reed, said member being otherwise free, and the extremity adjacent the front face of the reed being spaced therefrom toward the other reed to engage the other contact thereon.

6. A resonant reed relay as set forth in claim 5 wherein the contact means recited is U-shaped adjacent the front face of the reed on which it is mounted, comprising a bight and a pair of legs thereon extending toward the end of the reed, the bight being spaced back from the end, and the legs continuing over the end of the reed and back along the back face of the reed to the extremity secured to the back face of the reed.

7. A resonant reed relay as set forth in claim 6 wherein the looped contact member comprises a resilient wire.

8. The combination comprising a vibratile substantially flat reed having front and back opposite faces and a resilient contact on the end thereof, said contact comprising a resilient wire of U-shaped configuration including a bight spaced back from the free end of the reed and outwardly from the front face of the reed and further having a pair of legs extending from said bight obliquely toward the free end of the reed and looped over the free end of the reed, said legs continuing back from the end of the reed along the back face thereof [from] and secured at their extremities to said back face of said reed, the contact otherwise being free of said reed.

9. A resonant reed relay comprising a pair of reeds each having a base and a tongue, common means mounting said bases electrically insulated from one another with said tongue extending in parallelism therefrom and having opposed free ends, said reeds being of magnetically susceptible material and being of substantially the same size and having substantially equal natural frequencies of vibration, the free ends of said reeds having contact means thereon normally spaced apart and capaple of engagement upon vibration of said reeds, coil means and means mounting said coil means about said reeds for magnetizing said reeds upon electrical energization of said coil means, energization of said coil means with alternating electric current of substantially the same frequency as the natural frequency of vibration of said reeds causing said reeds to tend to vibrate for causing said contact means to come into engagement, one of said contact means comprising a resilient member extending obliquely *substantially throughout its length* out from the reed on which it is mounted *back toward the base of such reed and* toward the opposed reed and cooperable with the contact on the opposed reed *and having a free extremity disposed opposite the contact means on the other reed for contact therewith.*

*10. A resonant reed relay comprising a pair of reeds each having a base and a tongue, common means mounting said bases electrically insulated from one another with said tongues extending in parallelism therefrom and having opposed free ends, said reeds being of magnetically susceptible material and being of substantially the same size and having substantially equal natural frequencies of vibration, the free ends of said reeds having contact means thereon extending substantially no farther than the ends of said reeds and capable of engagement upon vibration of said reeds, coil means, and means mounting said coil means about said reeds for magnetizing said reeds upon electrical energization of said coil means, energization of said coil means with alternating electric current of substantially the same frequency as the natural frequency of vibration of said reeds, causing said reeds to tend to vibrate for causing said contact means to engage one another intermittently, at least one of said contact means being resilient and extending substantially throughout its length diagonally out away from the end of the reed on which it is mounted and back toward the base of that reed and having a free extremity disposed opposite the contact means on the other reed for contact therewith, the portion of the resilient contact means engageable with the other contact means being resilienly movable relative to the reed on which it is mounted, whereby to diminish contact bounce and apparent stiffening of the reeds upon engagement of said contact means.*

*11. In a vibrating reed device, the combination comprising a substantially flat blade-like member having front and back opposite flat faces and a resilient contact adjacent the end thereof, said contact comprising a resilient wire of* U*-shaped configuration including a bight spaced from the free end of said member and outwardly from the front face of said member, and further having a pair of legs extending from said bight substantially obliquely toward the free end of said member and continuing longitudinally of said member in engagement with one of said faces and secured to said one face of said member.*

References Cited in the file of this patent or the original patent

UNITED STATES PATENTS

| | | |
|---|---|---|
| 708,539 | Fell | Sept. 9, 1902 |
| 2,547,026 | Winkler | Apr. 3, 1951 |
| 2,570,315 | Brewer | Oct. 9, 1951 |
| 2,577,468 | Knos | Dec. 4, 1951 |
| 2,577,602 | Burton | Dec. 4, 1951 |
| 2,732,459 | Pollard | Jan. 24, 1956 |
| 3,064,097 | Osborne | Nov. 13, 1962 |